United States Patent [19]

Mizuno et al.

[11] Patent Number: 5,114,888
[45] Date of Patent: May 19, 1992

[54] SILICON NITRIDE SINTERED BODY AND METHOD FOR PRODUCING SAME

[75] Inventors: Kenichi Mizuno; Yo Tajima; Masakazu Watanabe, all of Nagoya, Japan

[73] Assignee: NGK Spark Plug Co., Ltd., Nagoya, Japan

[21] Appl. No.: 612,691

[22] Filed: Nov. 15, 1990

[30] Foreign Application Priority Data

Nov. 21, 1989 [JP] Japan ............... 1-300851

[51] Int. Cl.$^5$ .............................................. C04B 35/58
[52] U.S. Cl. ........................................ 501/96; 501/97; 501/98; 264/66
[58] Field of Search ................ 501/96, 98, 97; 264/66

[56] References Cited

U.S. PATENT DOCUMENTS

| | | | |
|---|---|---|---|
| 4,407,970 | 10/1983 | Komatsu et al. | 501/98 X |
| 4,609,633 | 9/1986 | Fukuhara et al. | 501/97 |
| 4,746,636 | 5/1988 | Yokoyama | 501/97 |
| 4,920,085 | 4/1990 | Yoshida et al. | 501/97 |
| 4,977,112 | 12/1990 | Matsui | 501/97 |
| 4,978,645 | 12/1990 | Ukyo et al. | 501/97 X |

FOREIGN PATENT DOCUMENTS

| | | |
|---|---|---|
| 61-155262 | 7/1986 | Japan . |
| 62-3077 | 1/1987 | Japan . |
| 62-41764 | 2/1987 | Japan . |
| 62-153169 | 7/1987 | Japan . |
| 63-248773 | 10/1988 | Japan . |

*Primary Examiner*—Karl Group
*Attorney, Agent, or Firm*—Fish & Richardson

[57] ABSTRACT

Silicon nitride base sintered body consists of: 1 to 20 wt % (as oxides) of at least one of rare earth elements; 0.5 to 8 wt % of V (as $V_2O_5$); 0.5 to 8 wt % (as oxides) of at least one of Nb, Ta, Cr, Mo and W; sum of the Va and VIa group elements according to the Periodic Table of the International Version (as oxides) being 1 to 10 wt %; and balance silicon nitride. It has high strength of 690-880 MPa (70-90 kgf/mm$^2$) and high oxidation resistance both at 1350° C. It is produced by 2 stage gas-pressure sintering in pressurized $N_2$ atmosphere, primarily at 1700°–1900° C. at 1 MPa (10 atm) or less and secondarily at 1600°–1900 C. at 10 MPa (100 atm) or above.

19 Claims, No Drawings

SILICON NITRIDE SINTERED BODY AND METHOD FOR PRODUCING SAME

BACKGROUND OF THE INVENTION

This invention relates to a silicon nitride base sintered body employed as a high temperature high strength material superior in both strength and oxidation resistance at higher temperatures.

Since a silicon nitride base sintered body exhibits high mechanical strength even at higher temperatures, it is a high temperature structural material, such as automotive engine parts or gas turbine engines.

Since silicon nitride is difficult to sinter by itself, the conventional practice has been to employ sintering methods of silicon nitride with the addition of sintering aids such as MgO, $Al_2O_3$, $ZrO_2$ or oxides of rare earth elements. It has also been known to use oxides of rare earth elements and compounds of the elements of the Va and VIa groups according to the Periodic Table of the International Version (hereinafter referred to the same), as additives, as taught by the JP-Patent-Kokai No. 61-155262 (1986) for W, JP-Patent Kokai No. 62-3077 (1987) for Mo, JP-Patent-Kokai No. 62-41764 (1987) for Cr, JP-Patent-Kokai No. 62-153169 (1987) for Nb and Ta and JP-Patent Kokai No. 63-248773 (1988) for Cr, Mo and W.

SUMMARY OF THE DISCLOSURE

However, if MgO, $Al_2O_3$ or $ZrO_2$, for example, is used as the sintering aid, a low-melting vitreous phase is formed in the grain boundary, thereby lowering the high temperature strength or oxidation resistance of the sintered product. If at least one of the oxides of rare earth elements alone is used, it is still difficult to sinter silicon nitride and a hot press has been necessitated to produce a dense structure.

Thus there is a great desire to develop a silicon nitride base sintered product which may have a more dense structure at lower sintering temperatures.

It is therefore an object of the present invention to provide a silicon nitride base sintered body which is superior in sinterability, that is, may be rendered more dense in the structure at lower sintering temperatures, while being superior in high temperature strength and oxidation resistance.

It is another object of the invention to provide a method for producing a silicon nitride base sintered body, in which it can be sintered with ease even with a complex configuration.

According to this invention, there is provided a silicon nitride base sintered body consisting essentially of 1 to 20 wt %, calculated as oxides, of one or more rare earth elements, 0.5 to 8 wt % of V, calculated as $V_2O_5$, 0.5 to 8 wt %, calculated as oxides, of at least one of Nb, Ta, Cr, Mo and W; with the sum of the amounts of the Va and VIa group elements according to the International Periodic Table, calculated as oxides, being 1 to 10 wt % and the balance being silicon nitride.

In accordance with the present invention, there is also provided a method for producing a silicon nitride base sintered body comprising: preparing a starting material mixture consisting essentially of 1 to 20 wt % of one or more of oxides of rare earth elements, which may be or include a substance or substances that may be thermally converted into oxides of rare earth elements, in which case the amount is calculated as oxides; 0.5 to 8 wt % of vanadium oxide, 0.5 to 8 wt % at least one of oxides of Nb, Ta, Cr, Mo and W, with the sum of the amounts of the Va and VIa group elements calculated as oxides being 1 to 10 wt %; and the balance being silicon nitride; forming the resulting mixture; subjecting the formed product to a primary sintering under a pressure of a nitrogen atmosphere of not more than 1 MPa (10 atm) and at a temperature of 1,700° to 1,900° C.; and subjecting the primarily sintered product to a secondary sintering under a pressure of the same atmosphere of not less than 5.1 MPa (50 atm) and at a temperature of not lower than 1,600° C.

According to the present invention, by the combined addition of suitable amounts of oxides of rare earth elements and oxides of V (vanadium) and the other Va and VIa group elements, a silicon nitride base sintered body may be produced which may have a dense structure at a relatively low sintering temperature of not higher than 1,800° C. and which is superior in high temperature strength and in resistance against oxidation.

Above all, even with gas pressure sintering, the sintered body of the present invention may also have highly satisfactory properties of a relative density of 100%, a flexural strength of 687 MPa (70 kgf/mm²) or higher and the oxidation weight gain of 0.2 mg/cm² or less even at a high temperature of 1,350° C.

DESCRIPTION OF THE PREFERRED EMBODIMENTS

Among the additive components, the rare earth elements are added in a range of 1 to 20 wt % as oxides to promote sintering. An amount of rare earth element lower than 1 wt % is ineffective as the sintering aid, whereas an amount of the same in excess of 20 wt % results in lowered mechanical strength of the sintered body. In addition, as the amount of addition of the rare earth oxides is increased, an increased amount of a melilite type-structured compound, which is harmful against low-temperature oxidation at 700° to 1,000° C. ($R_2Si_3O_3N_4$, where R represents at least one of rare earth elements), is yielded, thereby lowering the oxidation resistance of the sintered product. Therefore, the amount of addition of the rare earth elements is preferably 2 to 15 wt % (more preferably 2-10 wt %).

The reason for the addition of V and the other Va and VIa group elements, namely Nb, Ta, Cr, Mo and/or W is primarily that, the oxides of those elements are effective as sintering aids, and that, above all, vanadium oxide $V_2O_5$ has a melting point as low as 690° C., and hence addition of these oxides results in promotion of sintering at lower temperatures. Addition of the above mentioned oxides of the other Va and VIa group elements, namely $Nb_2O_5$, $Ta_2O_5$, $Cr_2O_3$, $MoO_3$ and $WO_3$, in conjunction with vanadium oxide, results in further improvement in sinterability under the synergistic effect. Thus it becomes possible to produce a dense sintered body by a sintering method such as gas pressure sintering, unlike the expensive HIP or hot press in which it is difficult to produce profiled articles with complex configuration. Secondly, in the context of improved sinterability, it becomes possible to produce a sintered body superior in material characteristics, above all, room temperature strength and high temperature strength. By the addition of V and the other Va and VIa group elements, such as Nb, Ta, Cr, Mo and/or W, silicides of these elements such as $VSi_2$, $V_5Si_3$, $NbSi_2$, $TaSi_2$, $CrSi_2$, $MoSi_2$, $WSi_2$, and/or further solid solution of V and the other Va and VIa group elements such as (V-Mo)Si$_2$ or the like, are yielded in the grain boundary and dispersed uniformly to improve the characteristics of the sintered product. Since these silicides have extremely high melting points of 1,500° to 2,500° C., there is no deterioration of the high temperature strength, that is the strength at up to about 1,400° C., of the sintered product.

The reason for adding V and the other Va and Via group elements in a total amount of the Va and Via group elements of 1 wt % to 10 wt %, calculated as oxides, is that, with the total amount of these components less than 1 wt %, the effect of the sintering aids is not developed, whereas, with the total amount of these components higher than 10 wt %, the grain boundary phase becomes excessive, while the dispersed phase, such as silicides or the like, is not uniformly dispersed but is aggregated to lower the high temperature strength. The preferred range of these components is 2 to 6 wt %.

On the other hand, the reason for adding V and the other Va and VIa group elements, each in an amount of 0.5 to 8 wt %, is that, with the amount less than 0.5 wt % or more than 8 wt %, the synergistic effect by combined addition as the sintering aids is not observed. The preferred range of addition of each of V and the other Va and the Via group elements is 1 to 5 wt %, respectively.

It is noted that addition of other or third components or impurities, such as Al$_2$O$_3$, Fe$_2$O$_3$, MgO and/or CaO, is not desirable since the high temperature strength of the sintered product is then lowered. Hence the upper limit of these other components is set to 1,000 ppm, even if these components are present as unavoidable impurities.

In preparing a silicon nitride base sintered body of the present invention, V and the other Va and Via group elements are usually added in the form of oxide powders as the starting materials. However, these may be in the form of substances (e.g., salts or hydroxides) which may be converted to the oxides during sintering. For the staring materials following conditions are preferred. The mean particle size of silicon nitride is not more than 1 μm and these of the additive components are not more than 3 μm. The purity of the additive components should be not less than 99% and the α-phase fraction of the silicon nitride powder is not lower than 90%. As the sintering method, hot-press method, hot isostatic press (HIP) method or a sintering method under the pressurized atmosphere (referred to as —gas pressure sintering—), may be applied extensively. The dense structure of the sintered product may be realized at a lower temperature particularly by the two-stage sintering employing, above all, the N$_2$ atmosphere under pressure, and the silicon nitride base sintered product having superior high temperature strength or the like properties may be produced easily. The primary sintering is preferably carried out under a pressurized atmosphere of not more than 1 MPa (10 atm, preferably up to 0.6 MPa (6 atm) and a temperature of 1,700° to 1,900° C. (preferably 1750° to 1850° C.), e.g., for 2 to 6 hours, until open pores will disappear throughout the entire body, for example, until the relative density of not less than 85% (preferably 90 to 97%) is realized. The secondary sintering is preferably carried out under conditions of a pressurized gas atmosphere of not less than 5.1 MPa (50 atm) and the temperature of not lower than 1,600° C. (preferably not more than 1900° C., more preferably 1700° to 1850° C.) e.g., for 2 to 4 hours until the desired density is achieved which can be 100%. The gas pressure is preferably up to 200 MPa (2000 atm) which, however, is due to the convenience of the apparatus.

In the following the present invention will be described in more detail by reference to the preferred embodiments.

EXAMPLES

Example 1 Sinterability

To Si$_3$N$_4$ powders with a mean particle size of 0.7 μm and an α-phase faction of 95% powders of oxides of rare earth elements having a mean particle size of 1 to 2 μm and parity of 99.9%, and powders of V$_2$O$_5$, Nb$_2$O$_5$, Ta$_2$O$_5$, Cr$_2$O$_3$, MoO$_3$ and WO$_3$, each having a mean particle size of not more than 1 μm and purity of not lower than 99%, were added at proportions shown in Table 1, respectively. The resulting powder mixtures were dried and molded by a hydrostatic press to a size of 10×10×50 mm under a pressure of 196 MPa (2 tons/cm$^2$), and the resulting molded product was sintered by the two-stage gas pressure sintering under the conditions of primary sintering under N$_2$ atmosphere of 0.2 MPa (2 atm) at 1,750° C. for 4 hours, and secondary sintering under N$_2$ atmosphere of 10.1 MPa (100 atm) at 1,700° C. for 2 hours. The density of the sintered body was measured by the Archimedes method. The resultant relative densities are shown in Table 1.

It is seen from Table 1 that, by combined addition of V$_2$O$_5$ and oxides of the other Va and VIa group elements, additional to the oxides of the rare earth elements as the sintering aids, the sinterability has been improved as compared to the case of addition of the sintering aids under the single-component aid according to comparative Examples 11 to 16, and that sintered products having a satisfactory and dense structure may be obtained as a result of the two-stage gas pressure sintering at a relatively lower sintering temperature of not higher than 1,800° C. It is also seen that, with the amount of V$_2$O$_5$ less than 0.5 wt % or in excess of 8 wt %, the effect of combined addition is not observed (comparative Examples 17 and 18) so that the improvement in sinterability is not achieved.

TABLE 1

| | Sample Nos. | Composition (wt %) | | | | | Relative density (%) of primary sintered body | Relative density (%) of secondary sintered body |
| | | Si$_3$N$_4$ | Oxides of rare earth elements | V$_2$O$_5$ | Oxides of Va and VIa group elements* | | | |
| Examples | 1 | 91 | Y$_2$O$_3$ 5 | 2 | Nb$_2$O$_5$ | 2 | 93 | 100 |
| | 2 | ↑ | ↑ ↑ | ↑ | Ta$_2$O$_5$ | 2 | 94 | ↑ |
| | 3 | ↑ | ↑ ↑ | ↑ | Cr$_2$O$_3$ | 2 | 91 | ↑ |
| | 4 | ↑ | ↑ ↑ | ↑ | MoO$_3$ | 2 | 94 | ↑ |
| | 5 | ↑ | ↑ ↑ | ↑ | WO$_3$ | 2 | 93 | ↑ |
| | 6 | 88 | Er$_2$O$_3$ 10 | 1 | MoO$_3$ | 1 | 93 | ↑ |
| | 7 | ↑ | ↑ ↑ | ↑ | WO$_3$ | 1 | 94 | ↑ |

TABLE 1-continued

|  | Sample Nos. | Composition (wt %) | | | | | | Relative density (%) of primary sintered body | Relative density (%) of secondary sintered body |
|---|---|---|---|---|---|---|---|---|---|
|  |  | Si$_3$N$_4$ | Oxides of rare earth elements | | V$_2$O$_5$ | Oxides of Va and VIa group elements* | | | |
|  | 8 | 85 | Y$_2$O$_3$ | 5 | 5 | Ta$_2$O$_5$ | 5 | 94 | ↑ |
|  | 9 | ↑ | ↑ | ↑ | ↑ | WO$_3$ | 5 | 95 | ↑ |
|  | 10 | 85 | Yb$_2$O$_3$ | 5 | 5 | MoO$_3$ | 5 | 95 | ↑ |
| Comparative | 11 | 91 | Y$_2$O$_3$ | 5 | 4 | — | | 90 | 98 |
| Examples | 12 | ↑ | ↑ | ↑ | — | Nb$_2$O$_5$ | 4 | 88 | 92 |
|  | 13 | ↑ | ↑ | ↑ | — | Ta$_2$O$_5$ | 4 | 89 | 95 |
|  | 14 | ↑ | ↑ | ↑ | — | Cr$_2$O$_3$ | 4 | 85 | 90 |
|  | 15 | ↑ | ↑ | ↑ | — | MoO$_3$ | 4 | 89 | 93 |
|  | 16 | ↑ | ↑ | ↑ | — | WO$_3$ | 4 | 89 | 93 |
|  | 17 | 90.7 | Y$_2$O$_3$ | 5 | 0.3 | MoO$_3$ | 4 | 89 | 94 |
|  | 18 | 85 | Y$_2$O$_3$ | 5 | 9 | WO$_3$ | 1 | 86 | 91 |

*Other than V

Example 2 Properties

The same starting powders as those used in Example 1 were mixed together and dried in proportions shown in Table 2, respectively. The resulting powder mixture was molded to a size of 50×50×10 mm using a hydrostatic press under a pressure of 2 ton/cm². The so-produced molded product was sintered by gas pressure sintering under the conditions of primary sintering under N$_2$ atmosphere of 2 atm at 1,750° C. for 4 hours and secondary sintering under N$_2$ atmosphere of 100 atm at 1,700° C. for 2 hours. The properties of the sintered products, namely the flexural strength and the oxidation weight gain (weight increase per unit surface area through oxidation), were measured by the following methods:

(i) Flexural Strength; the flexural strengths of the sintered products were measured by the three point bending strength measuring method in accordance with JIS-R 1601 and JIS-R 1604 at room temperature and 1,350° C.:

(ii) Oxidation Weight Gain; the increase in weight of the samples of 3×4×35 mm in size was measured after oxidation for 100 hours in the ambient atmosphere at 1,000° C. and 1,350° C. The results are shown in Table 2.

TABLE 2

|  | Sample Nos. | Composition (wt %) | | | | | | Relative density (%) | Flexural strength (kgf/mm²)** | | Weight gain after oxidation | |
|---|---|---|---|---|---|---|---|---|---|---|---|---|
|  |  | Si$_3$N$_4$ | Oxides of rare earth elements | | V$_2$O$_5$ | Oxides of group Va and VIa elements* | | | Room temperature | 1350 °C. | 1000 °C. | 1350 °C. |
| Examples | 19 | 91 | Y$_2$O$_3$ | 5 | 2 | Nb$_2$O$_5$ | 2 | 100 | 99 | 85 | 0.04 | 0.11 |
|  | 20 | ↑ | ↑ | ↑ | ↑ | Ta$_2$O$_5$ | 2 | ↑ | 101 | 86 | 0.05 | 0.12 |
|  | 21 | ↑ | ↑ | ↑ | ↑ | Cr$_2$O$_3$ | 2 | ↑ | 98 | 83 | 0.05 | 0.10 |
|  | 22 | ↑ | ↑ | ↑ | ↑ | MoO$_3$ | 2 | ↑ | 106 | 89 | 0.04 | 0.10 |
|  | 23 | ↑ | ↑ | ↑ | ↑ | WO$_3$ | 2 | ↑ | 105 | 90 | 0.03 | 0.11 |
|  | 24 | 93 | Sc$_2$O$_3$ 1 / Y$_2$O$_3$ 1 | | 4 | MoO$_3$ | 1 | ↑ | 102 | 88 | 0.01 | 0.06 |
|  | 25 | 88 | Er$_2$O$_3$ | 10 | 1 | WO$_3$ | 1 | ↑ | 98 | 87 | 0.06 | 0.11 |
|  | 26 | 86 | ↑ | ↑ | 2 | MoO$_3$ | 2 | ↑ | 106 | 90 | 0.06 | 0.10 |
|  | 27 | 86 | ↑ | ↑ | 2 | Ta$_2$O$_5$ | 2 | ↑ | 100 | 89 | 0.07 | 0.12 |
|  | 28 | 85 | Yb$_2$O$_3$ | 5 | 5 | MoO$_3$ | 5 | ↑ | 95 | 77 | 0.04 | 0.12 |
|  | 29 | 86 | ↑ | ↑ | 3 | Ta$_2$O$_5$ 3 / WO$_3$ 3 | | ↑ | 97 | 81 | 0.04 | 0.11 |
|  | 30 | 82 | Er$_2$O$_3$ 8 / Yb$_2$O$_3$ 8 | | 1 | Cr$_2$O$_3$ | 1 | ↑ | 92 | 80 | 0.12 | 0.14 |
|  | 31 | 85 | La$_2$O$_3$ | 6 | 7 | WO$_3$ | 2 | ↑ | 91 | 75 | 0.09 | 0.13 |
| Comparative | 32 | 91 | Y$_2$O$_3$ | 5 | 4 | — | | 98 | 82 | 71 | 0.14 | 0.26 |
| Examples | 33 | ↑ | ↑ | ↑ | — | Ta$_2$O$_5$ | 4 | 95 | 76 | 61 | 0.18 | 0.32 |
|  | 34 | ↑ | ↑ | ↑ | — | MoO$_3$ | 4 | 93 | 77 | 59 | 0.25 | 0.51 |
|  | 35 | 85 | ↑ | ↑ | 9 | WO$_3$ | 1 | 91 | 74 | 50 | 0.22 | 0.55 |
|  | 36 | 85.5 | ↑ | ↑ | 0.5 | Cr$_2$O$_3$ | 9 | 89 | 71 | 51 | 0.34 | 0.62 |
|  | 37 | 83 | ↑ | ↑ | 6 | Nb$_2$O$_5$ | 6 | 99 | 86 | 45 | 0.11 | 0.24 |
|  | 38 | 74 | Y$_2$O$_3$ | 22 | 2 | MoO$_3$ | 2 | 100 | 76 | 53 | 1.43 | 0.54 |

*Other than V
**1 kgf/mm² = 9.81 MPa

It is seen from Table 2 that the sintered products obtained in accordance with the present invention (Examples 19 to 31) under reduction in strength only to an extremely limited extent in a temperature range of from room temperature to 1,350° C. and exhibit a high strength of not less than 687 MPa (70 kgf/mm$^2$, or further 80, 85 or 90 kgf/mm$^2$ or higher) even at 1,350° C. They also exhibit satisfactory oxidation resistance expressed as the weight gain after oxidation testing at 1,000° C. and 1,350° C. generally of as low as 0.2 mg/cm$^2$ or less (preferably 0.14 or 0.12 mg/cm$^2$ or/less, more preferably 0.1 mg/cm$^2$ or less). Conversely, the products of the Comparative Examples 32 to 36, in which V$_2$O$_5$ and other oxides of the Va nd VIa group elements are not added in combination, are not dense in structure at the sintering temperature of not higher than 1,800° C. and are inferior in both the strength and the oxidation resistance to the inventive products. Thus the former lacks the meritorious effects of the defined combined addition of the sintering aids. On the other hand, the product of the Comparative Example 37, in which the sum of the amounts of V$_2$O$_5$ and Nb$_2$O$_5$ is 12 wt % and thus exceeds the specific range of 10 wt % of the present invention, has an excess amount of the grain boundary phase and is markedly lowered in strength at 1,350° C. The product of Comparative Example 38, in which oxides of the rare earth elements are used in an excessive amount, is rich in mellilite type-structured compounds and has markedly deteriorated oxidation resistance at 1,000° C. while being inferior in both room temperature strength and high temperature strength to the products of the Examples of the present invention.

Meanwhile, structural observation by SEM and X-ray diffractiometry has revealed that, among the additive components, the rare earth elements are present in the grain boundary region as high melting glass or H-phase (R$_{2\theta}$N$_4$Si$_{12}$O$_{48}$, R being at least one of rare earth elements) and the Va and VIa group elements are present in a dispersed state as silicides. These silicides were single silicides of any one of V and other Va and VIa group elements or complex silicides of two or more of the Va and VIa group elements. Above all, the Va and VIa group elements were observed as silicides, and were not observed in the form of any other phase, that is, as oxides, nitrides or solid solutions thereof. Thus the oxides concerned have been converted in their entirety into silicides. On the other hand, silicon nitride was formed to exist substantially in the form of β-phase columnar grains having a shorter diameter of not longer than 1 μm and a longitudinal diameter of not longer than 10 μm, thus indicating that the grain growth was suppressed.

The oxidation weight gain tested at 1000° C. is 0.12 mg/cm$^2$ or less or further 0.06 mg/cm$^2$ or less and 0.01 mg/cm$^2$ at best as shown in Table 2. The room temperature strength generally amounts to at least 90 kgf/mm$^2$, or further 100 kgf/mm$^2$ or more, and can achieve 106 kgf/mm$^2$ or more, which figures are far superior to the comparative examples, too.

As is exemplified, the rare earth oxides of Y, Er, Yb and/or Sc are preferred, particularly Y, Er and/or Yb.

What is claimed is:

1. A silicon nitride base sintered body consisting essentially of:
    1 to 20 wt %, calculated as oxides, of at least one rare earth element;
    0.5 to 8 wt % of V calculated as V$_2$O$_5$;
    0.5 to 8 wt %, calculated as oxides, of at least one selected from the group consisting of Nb, Ta, Cr, Mo and W; with the sum of the amounts of Va and VIa group elements according to the International Periodic Table, calculated as oxides, being 1 to 10 wt %;
    and the balance being silicon nitride.

2. The sintered body as defined in claim 1, in which the sum of the Va and VIa group elements amounts to 2 to 6% by weight.

3. The sintered body as defined in claim 1, in which the V is present in an amount, calculated as oxide, of 1 to 5% by weight.

4. The sintered body as defined in claim 1, which the amount of Va and VIA group elements other than V is 1 to 5% by weight, calculated as oxide.

5. The sintered body as defined in claim 1, which has an oxidation weight gain of 0.2 mg/cm$^2$ or less when tested at 1350° C. for 100 hours in the ambient atmosphere.

6. The sintered body as defined in claim 5, which has an oxidation weight gain of 0.12 mg/cm$^2$ or less when tested at 1000° C. for 100 hours in the ambient atmosphere.

7. The sintered body as defined in claim 1, which has a flexural strength at 1350° C. of at least 687 MPa.

8. The sintered body as defined in claim 1, in which the silicon nitride is present substantially in the form of β-phase columnar grains.

9. The sintered body as defined in claim 8, in which the silicon nitride columnar grains have a longitudinal diameter of not longer than 10 μm.

10. The sintered body as defined in claim 1, in which the sum of Al$_2$O$_3$, Fe$_2$O$_3$, MgO and CaO present in the body does not exceed 1000 ppm.

11. The sintered body as defined in claim 8, in which the silicides of the Va and VIA group elements are uniformly dispersed at the grain boundary of the silicon nitride grains.

12. The sintered body as defined in claim 1, in which the rare earth is selected from the group consisting of Y, Er, Yb, La and Sc.

13. A method for producing a silicon nitride base sintered body comprising:
    preparing a starting material mixture consisting essentially of 1 to 20 wt % of at least one oxide of a rare earth element or at least one substance that may be thermally converted into oxides of rare earth elements, the amount of said at least one substance being calculated as oxide; 0.5 to 8 wt % of vanadium oxide; 0.5 to 8 wt % of at least one of oxides of Nb, Ta, Cr, Mo and W; with the sum of the amounts of Va and VIa group elements calculated as oxides being 1 to 10 wt %, and the balance being silicon nitride;
    forming the starting material mixture into a formed product;
    subjecting the formed product to primary sintering under a pressure of a nitrogen atmosphere of not more than 1 MPa (10 atm) and at a temperature of 1,700° to 1,900° C. to produce a primary sintered product;
    subjecting the primary sintered product to a secondary sintering under a pressure of a nitrogen atmosphere of not less than 5.1 MPa (50 atm) and at a temperature of not lower than 1,600° C.

14. The method as defined in claim 13, in which the primary sintering is carried out until open pores disappear.

15. The method as defined in claim 13, in which the primary sintered product achieves a relative density of at least 85%.

16. The method as defined in claim 13, in which the secondary sintering is carried out until a relative density of 100% as measured by the Archimedes method is achieved.

17. The method as defined in claim 13, in which the secondary sintering is carried out at a temperature not higher than 1900° C.

18. The method as claimed in claim 13, in which the starting mixture does not include a combined amount of $Al_2O_3$, $Fe_2O_3$, MgO and CaO in an amount exceeding 1000 ppm.

19. The method as defined in claim 13, in which the silicon nitride has an $\alpha$-phase fraction of at least 90% and a particle size of not more than 1 $\mu$m.

* * * * *